INVENTOR
Varney K. Sturges

UNITED STATES PATENT OFFICE.

VARNEY K. STURGES, OF OAKLAND, CALIFORNIA.

METHOD OF VULCANIZING, AND CORE FOR TIRE MOLDS.

1,407,355.   Specification of Letters Patent.   Patented Feb. 21, 1922.

Application filed September 20, 1920. Serial No. 411,426.

*To all whom it may concern:*

Be it known that I, VARNEY K. STURGES, a citizen of the United States, residing at the city of Oakland, in the county of Alameda and State of California, have invented certain new and useful Improvements in Methods of Vulcanizing, and Cores for Tire Moulds, of which the following is a specification.

This invention relates to improvements in a process and apparatus for forming pneumatic tire casings.

The principal object of my invention is to provide a process of forming and curing tire casings in which the fabric or cords of the casing are stretched before being subjected to the heat of vulcanization. My process contemplates the forming of the casing on a flat sided metallic core and when it is completely built up, cheek plates or annular segment are inserted between the sides of this core and the side walls of the casing, which stretch the latter and give the proper contour to the walls of the casing. A further stretching of the tire takes place when the outside mold sections are placed in position as that portion of the mold which forms the bead of the casing causes the latter part of the casing to be pressed inwardly and therefore stretches the side walls around the core.

By the use of this process the air inflated core which is now used is done away with. This in turn reduces materially the expense of curing the tires as these air cores can only be used for a comparatively few times.

With these and other objects in view, my invention consists in the novel processes and features of construction herein described and illustrated and more specifically pointed out in the appended claims.

Reference being had to the accompanying drawings forming a part of this specification:

Figure 1:
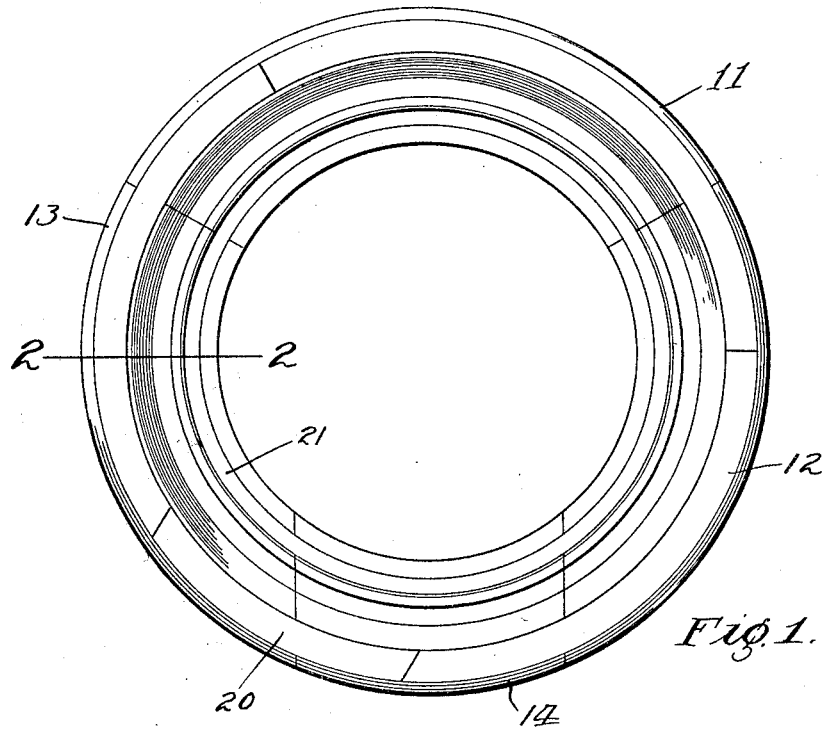
Figure 1 is a view in plan of my improved metallic core.
Figure 2:
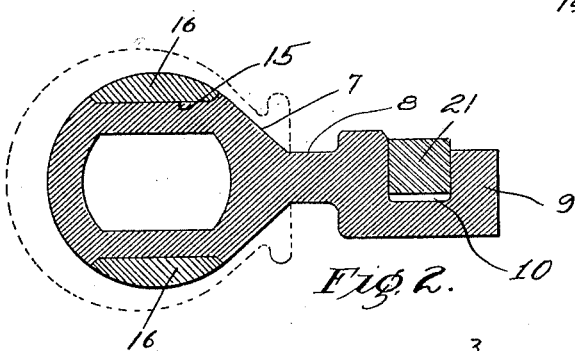
Figure 2 is an enlarged view in section on the line 2—2 Figure 1.
Figure 3:
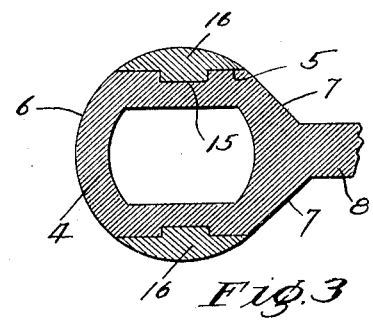
Figure 3 is a similar view showing a modified cross section of the improved core.
Figure 5:
Figure 5 is a view in section showing the core and a casing thereon as when the latter is being formed.
Figure 4:
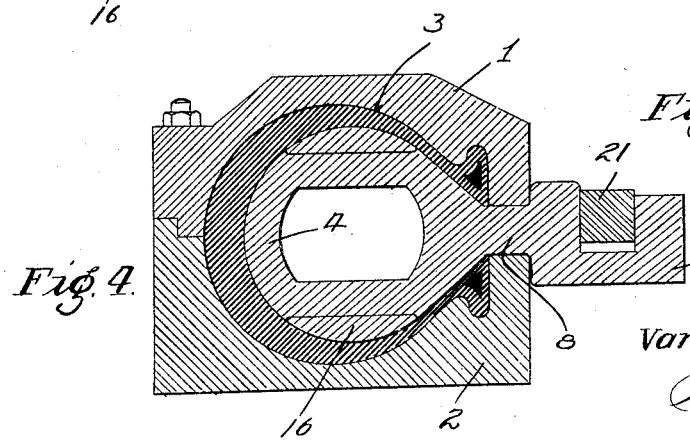
Figure 4 is a view in section showing the core, and the molds in their closed position, and a casing held therebetween.

Referring to corresponding parts in the several views by the same numerals of reference: 1 and 2 indicate the upper and lower mold sections which have the annular cavity 3 that conforms in outline to that of the outside of the tire. The core used in connection with this mold comprises the annular portion 4 which has the flat sides 5 and the outer arcuate surface 6. From the flat sides 5 there extends straight conveying surfaces 7 which join the stem 8.

Extending inwardly from the stem is an annular recessed head 9, the recess 10 being square in section and forming a circle around the core. The latter is formed in several segments as indicated at 11, 12 and 13, and a key section 14, the sides of which are parallel in distinction to the abutting faces of sections 11, 12 and 13 which are radial. The side surfaces 5 are provided with annular recesses 15, and cheek plates 16 are provided which have a rib for engagement with the recess 15. The outer contour of these cheek plates is a continuation of an arc or such other curve as may be required to connect the arc with the straight surfaces 7. These plates like the body of the core are divided at intervals in a radial direction and there is also provided a key plate 20 which must be first removed and last placed in position. The body segments 11, 12, 13 and 14 are held in alignment by means of a ring 21, this ring fitting closely within the recess 10, and thus holding the body segments in accurate alignment.

In operation, the tire is built over the body of the core without the cheek plates in position. Then, after it is finished, the inner edge of the side wall is lifted up and the cheek plates inserted. This causes the sides to be bulged outwardly. It will be understood that the bead of the casing is comparatively inelastic, hence the diameter across this point cannot be increased with the consequences that when the plates are inserted a stretching of the fabric of the tire takes place. The placing of the plates in position may cause the bead to be left away from the stem 8. But when the outside mold sections are clamped together the beads are again pulled into position, thus further stretching the fabric.

In this manner all slack is taken up in the fabric or cords and they are placed in tension before being subjected to heat.

Having thus described my invention, I claim as new and wish to cover by Letters Patent:

1. The process of forming tire casings which consists of building the casing about a flat sided metallic core, inserting cheek plates between the side walls of the casing and the flat sides of said core to stretch the fabric of the casing, and then enclosing said casing and core between mold sections.

2. The process of forming tire casings which consists in building the casing with flat side walls, expanding the flat side walls over an inelastic core, surrounding said casing by a mold while retaining the core in position, and then subjecting the casing to a vulcanizing heat.

3. The process of forming a tire casing which consists in building the casing over a flat sided annular metal core, expanding the side walls of the casing by inserting cheek plates between the flat sides of the core and the inside of the walls and then enclosing the casing in a mold and subjecting it to a vulcanizing temperature.

4. The process of forming a tire casing which consists in building the casing about a flat sided, inelastic, metallic core, expanding and stretching the flat formed portions of the casing to substantially their final shape by inserting plates between the flat sides of the core and the inside of the casing and then stretching the sides of the casing by pressing the inner side wall edges toward each other.

5. The process of forming a tire casing which consists in building the casing about a flat sided, inelastic, metallic core, expanding and stretching the flat formed portions of the casing, to substantially their final shape by inserting plates between the flat sides of the core and the inside of the casing and then further stretching the material of the casing by pressing the inner side wall edges toward each other while maintaining a constant diameter of the said inner edges.

6. A core for tire casings comprising intermediate segments, means extending inwardly from said segments for holding them in alignment to form a ring having flat sides and an arcuate outer surface, and cheek plates adapted to seat loosely on said flat sides, and having an outer surface adapted to complete the contour of the core.

7. A core for tire casings comprising a ring having a contour conforming to the inside of the casing, said ring comprising a plurality of segments to permit its removal from the casing, means for holding said segments in rigid aligning relation to each other and removable cheek plates loosely seated on said segments to form the sides of said ring.

8. A core for tire casings comprising an annular form having an outside surface conforming in contour to the inside of the casing, a segmental center section, segmental removable cheek plates on the sides of the central section and means for holding said plates on the sides of said central section and means for binding said central sections together independently of said cheek plates.

9. A core for tire casings comprising a ring shaped member having an outside contour conforming to the inside of the casing, said ring comprising a segmental central body having flat sides, means removably extending inwardly for holding said segmental central body in rigid aligning relation, removable cheek plates seated on the said flat sides and means to prevent radial movement of said cheek plates in either direction.

10. A core for tire casings comprising a ring shaped member having an outside contour conforming to the inside of the casing, said ring comprising a segmental central body having flat side surfaces, removable side plates adapted to seat loosely on said flat side surfaces and cooperating ribs and grooves extending at right angles to said surfaces for holding said side plates in a given radial position on said central body.

11. A core for tire casings comprising a ring shaped member having an outside contour conforming to the inside of the casing, said ring comprising a central body formed of segments and having parallel flat side surfaces, means extending inwardly from said segments for holding them in alignment, removable side plates adapted to seat on said side surfaces, said surfaces having outwardly opening annular grooves and ribs on said plates for engagement with said grooves.

In testimony whereof I affix my signature.

VARNEY K. STURGES.